UNITED STATES PATENT OFFICE.

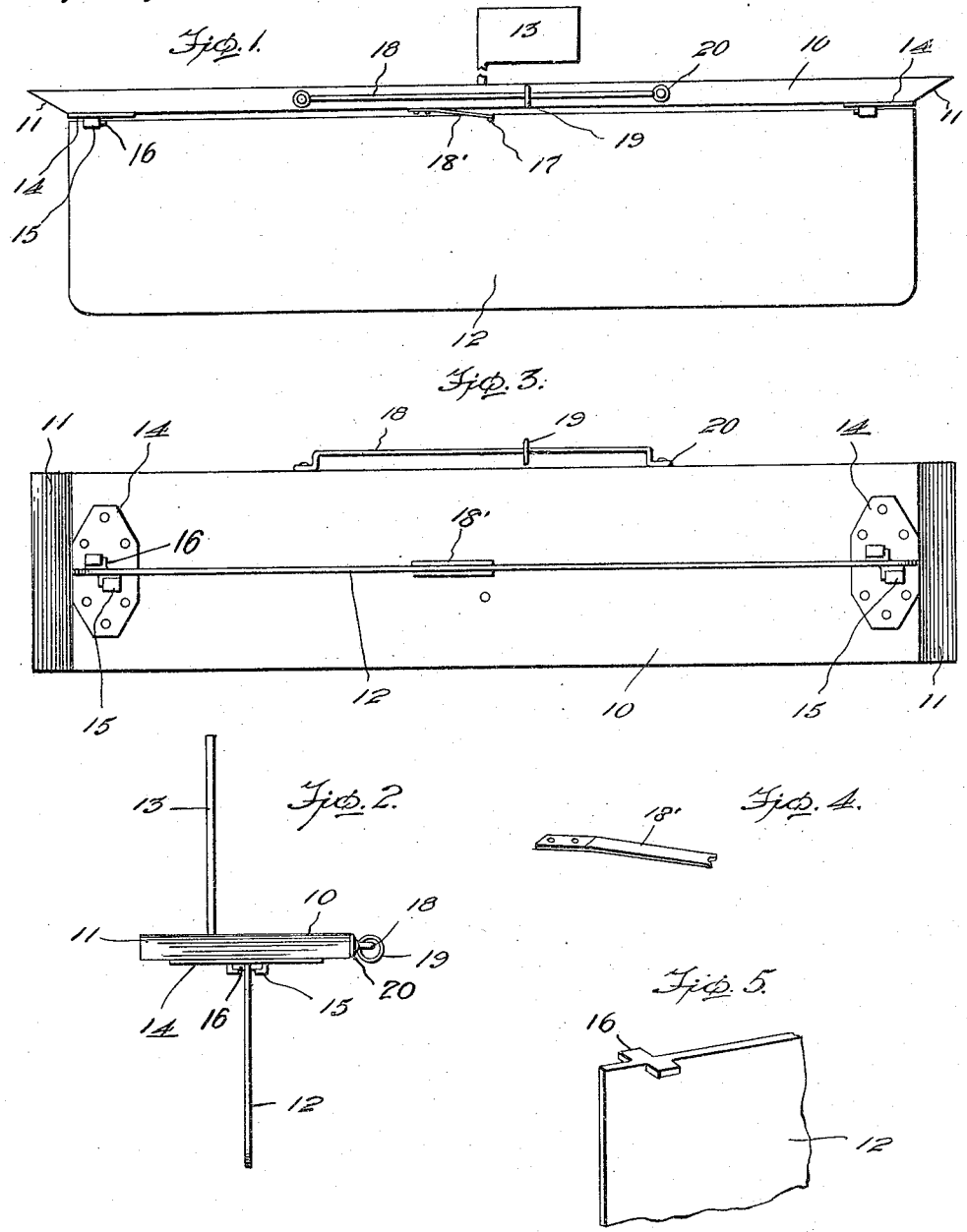

CARL I. OBERG, OF BROWNVILLE, MAINE.

FISH-LINE GUIDE.

1,227,300. Specification of Letters Patent. Patented May 22, 1917.

Application filed July 24, 1916. Serial No. 111,006.

*To all whom it may concern:*

Be it known that I, CARL I. OBERG, a citizen of the United States, residing at Brownville, in the county of Piscataquis and State of Maine, have invented certain useful Improvements in Fish-Line Guides, of which the following is a specification, reference being had therein to the accompanying drawing.

This invention relates to improvements in a fish line guide, one object of the invention being the provision of a float which will guide the line and hold the same a predetermined distance away from the boat or shore and which will also carry an indicating mark, such as a flag, so that the location of the float may be readily seen.

A further object of the invention is the provision of a device of this character which will glide upon the water without making any ripples and which will be steady due to a depending fin carried longitudinally and centrally of the float.

In the accompanying drawings:—

Figure 1 is a side elevation of the complete guide.

Fig. 2 is an end view thereof.

Fig. 3 is a bottom plan view thereof.

Figs. 4 and 5 are detail views of various parts.

Referring to the drawings, the numeral 10 designates the float body or board which has the tapered ends 11, while attached thereto and depending therefrom is the keel 12 of sheet metal, the same being disposed centrally and longitudinally of the board 10.

Mounted on the upper surface of the board centrally thereof and projecting upwardly therefrom is a signaling device 13, here indicated as a flag.

The keel 12 is secured by the holders or plates 14 attached to the underside of the board 10 and provided with the flanges 15 to receive the oppositely extending lugs 16 on the upper edge of such keel.

The keel 12 is further provided in its upper edge with a notch 17 while a leaf spring 18' has one end attached to the underside of the board 10 and the free end engaging the notch 17 so that the keel is held against longitudinal movement.

Attached to one side edge of the board is a bar 18 on which is slidably mounted a ring by means of which the fishing line (not shown) is guided. As will be noted the angularly bent ends of the bar terminate in eyes 20 which when secured to the edge of the board maintain the main portion of the bar in spaced parallel relation therewith.

What I claim as new is:—

In a fish line guide, a board float, a pair of plates secured to the under face of said board float near its ends and having opposed ears cut therefrom and bent outwardly and inwardly toward each other to form cleats, a keel plate having lugs extending from one edge at right angles thereto beyond opposite sides for slidably detachable engagement in the cleats, and a leaf spring catch on the board float for locking with the plate to hold the lugs engaged in the cleats.

In testimony whereof I affix my signature.

CARL I. OBERG.